United States Patent [19]

Saito

[11] Patent Number: 5,625,737

[45] Date of Patent: Apr. 29, 1997

[54] OPTICAL FIBER HOLDER AND METHOD USING SAME

[75] Inventor: Masami Saito, Carrollton, Ga.

[73] Assignee: Lucent Technologies Inc., Murray Hill, N.J.

[21] Appl. No.: 570,143

[22] Filed: Dec. 11, 1995

[51] Int. Cl.$^6$ .................. G02B 6/00; B65H 23/00
[52] U.S. Cl. .................. 385/137; 385/136; 385/134; 385/135; 385/147; 242/566; 242/125.1; 242/125.2; 242/125.3
[58] Field of Search .................. 385/24, 27, 31, 385/52, 54, 88, 89, 115, 116, 136, 137, 147, 134, 135; 242/566, 125, 125.1, 125.2, 125.3, 128, 140, 157 R

[56] References Cited

U.S. PATENT DOCUMENTS

| | | | |
|---|---|---|---|
| 3,644,922 | 2/1972 | James et al. | 385/116 X |
| 3,819,442 | 6/1974 | Brushenko | 385/116 X |
| 3,989,578 | 11/1976 | Hashimoto | 385/136 X |
| 4,029,390 | 6/1977 | Chinnock et al. | 385/134 X |
| 4,046,454 | 9/1977 | Pugh, III | 385/65 X |
| 4,111,522 | 9/1978 | Auracher et al. | 385/65 X |
| 4,772,086 | 9/1988 | Bellerby et al. | 385/89 X |
| 5,121,459 | 6/1992 | Chiang | 385/120 |
| 5,146,532 | 9/1992 | Hodge | 385/136 |
| 5,377,286 | 12/1994 | Iida et al. | 385/33 |

Primary Examiner—Brian Healy

[57] ABSTRACT

A holder for a plurality of fibers has a top wall, a bottom wall, and first and second side walls. The top wall is preferably releasably hinged to one of the two side walls so that the plurality of fibers may be contained within the holder. The fibers are maintained in a certain order within the holder by selecting the spacing between the two side walls to be greater than the outer diameter of the cables but less than twice the outer diameter of the cables. In this manner, two adjacent fibers cannot switch places with each other within the holder. The holder may have one or more intermediate walls positioned between the two side walls to divide the plurality of fibers into two or more groups. By maintaining the fibers in a fixed certain order, the fibers cannot become intertwined with each other and the chance that the fibers become bent is reduced. Since the chance that the fibers become bent is reduced, the risk of fiber breakage or signal loss is also reduced. The fiber holder also reduces the amount of time needed to unravel a group of intertwined fibers and therefore increases the efficiency of the coupling process.

14 Claims, 4 Drawing Sheets

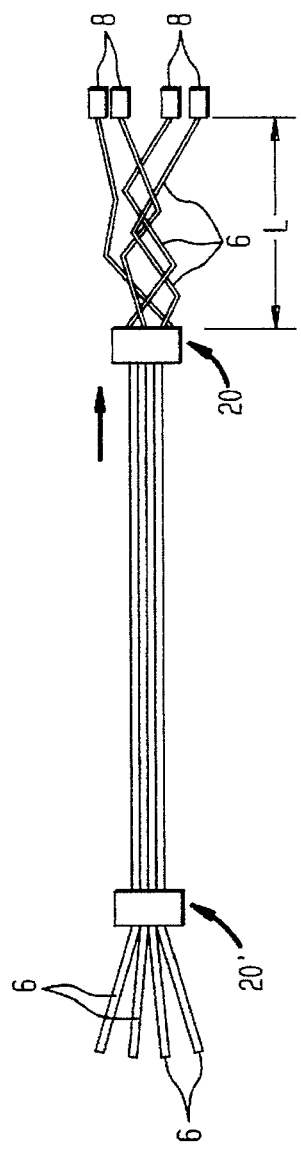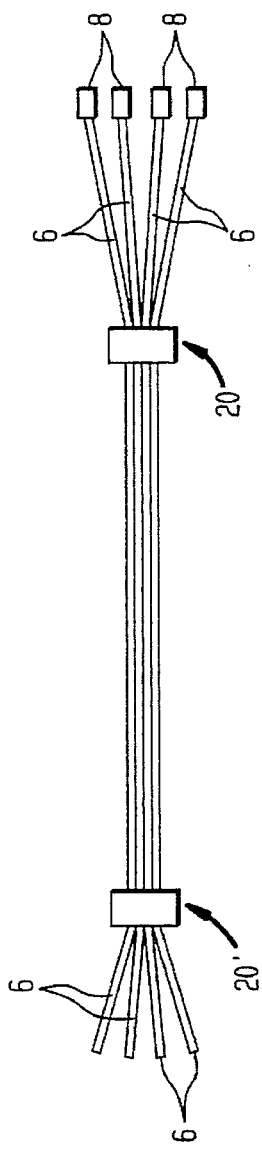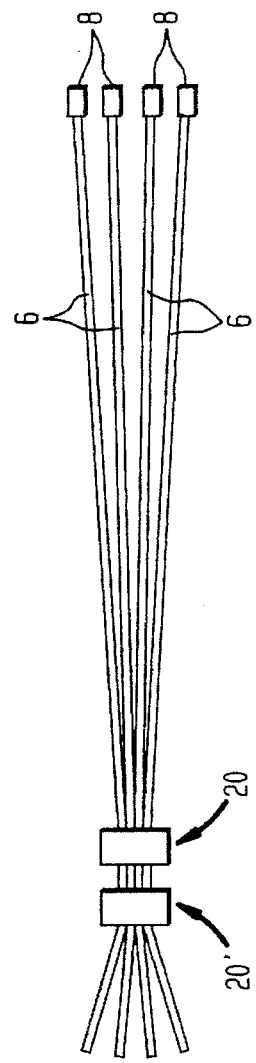

OPTICAL FIBER HOLDER AND METHOD USING SAME

FIELD OF THE INVENTION

This invention relates to a cable holder and, more particularly to a cable holder for use with cables having a plurality of optical fibers.

BACKGROUND OF THE INVENTION

Most optical fiber cables are comprised of a plurality of optical fibers. Because optical fibers are thin and fragile, such multi-fiber cables have various members along the length of the fibers for protecting the fibers from becoming bent or stressed, such as a buffer tube, an inner tension member extending along the length of the cable, and outer sheaths. The protective members reduce any signal loss or fiber breakage by limiting the amount in which the optical fibers are bent or otherwise exposed to external forces.

When the optical fibers in an optical cable are spliced or coupled to other fibers or components, the fibers must be separated from many of the protective members in the cable and routed to their respective splicing or coupling locations. Often, each optical fiber is separated from the outer sheaths, the tension member, and its buffer tube, so that only the optical fibers and their surrounding furcation tubes are routed to coupling locations for the optical fibers. The specific coupling location for an optical fiber can vary but is often a location in a fiber distribution shelf or a splice closure.

In routing the optical fibers in a cable to their respective locations, however, the unprotected optical fibers can become damaged. Typically, the individual optical fibers and their respective furcation tubes are bundled together within a spiral tube and routed as a group to the distribution shelf or closure. The optical fibers and furcation tubes can become intertwined with each other within the spiral tube and, at times, become so twisted that some of the optical fibers become bent, thereby introducing a signal loss or causing the fiber to break. The entanglement of the fibers within the spiral tube is therefore a problem when routing the fibers in a multi-fiber cable to their points of termination or splicing.

Because the optical fibers are intertwined within the spiral tube, they must be untangled and separated at the exit of the spiral tube before being routed to their respective termination points. A technician, such as an installer or lineman, must carefully remove each fiber from the tangled bundle so that none of the fibers will become critically bent. The process by which the fibers are unraveled is laborious, extremely time consuming, and inefficient. Consequently, a need exists for a device or method by which the fibers can quickly and easily become unraveled.

The problems with intertwined fibers is not limited to the above-described examples of a fiber distribution shelf or a splice closure. Rather, any situation in which optical fibers can become intertwined is potentially damaging since the fibers can become bent, thereby introducing a signal loss or causing the fiber to break. While the problem of fiber bending has been described with reference to fibers within furcation tubes, the fibers can frequently become bent within the buffer tubes. Also, the optical fibers need not come from a single multi-fiber cable but may alternatively come from more than one source, such as two optical cables, thereby compounding the problems of separation without damage thereto.

SUMMARY OF THE INVENTION

The present invention, while applicable to a wide variety of stranded or filamentary communications media, in a preferred embodiment thereof, is shown as used with optical fibers. The invention is a holder for use with a plurality of fibers for maintaining the fibers in fixed order relative to each other regardless of variations in the diameter of the fibers. The holder has first and second side walls parallel to each other and top and bottom walls parallel to each other. To accommodate fibers of varying diameters, the two side walls are spaced apart from each other a predetermined distance which is greater than the outer diameter of the largest fiber and is less than twice the outer diameter of the smallest fiber. By spacing the side walls this predetermined distance apart, an order of the fibers within the holder is fixed whereby adjacent fibers cannot switch places within the holder. Also, since the fibers are maintained in a fixed order, the fibers do not become intertwined and bending of the fibers is reduced. The top and bottom walls are spaced apart from each other a certain distance with that certain distance being sufficient to receive the plurality of fibers, such as buffered fibers regardless of their diameter that are contained within the space between the side walls.

In the preferred embodiment, the holder is designed for use with optical fibers and maintains the fibers in a fixed order. By moving the holder to the end of the fibers, fibers which may have been intertwined are unraveled and are placed into the fixed order. The fiber holder reduces the amount of time needed to unravel a group of optical fibers and allows the coupling of the fibers to other fibers or components to be performed more quickly and efficiently.

The principles and features of the present invention will be more readily apparent and understood from the following detailed description, read in conjunction with the accompanying drawings.

BRIEF DESCRIPTION OF THE DRAWINGS

FIG. 3 (B) is a perspective view of two fiber holders of FIG. 2 mounted to a fiber bundle;

FIG. 4 (B) is a side view of the fiber holder of FIG. 4(A) shown in its mounting position;

FIG. 5 (B) is a side view of the fiber holder of FIG. 5(A) shown in its mounting position;

FIG. 6 (B) is a side view of the fiber holder of FIG. 6(A) shown in its mounting position; and FIGS. 7 (A), (B), and (C) illustrate a method of using two fiber holders according to the invention on a fiber bundle.

DETAILED DESCRIPTION

Figure 1:
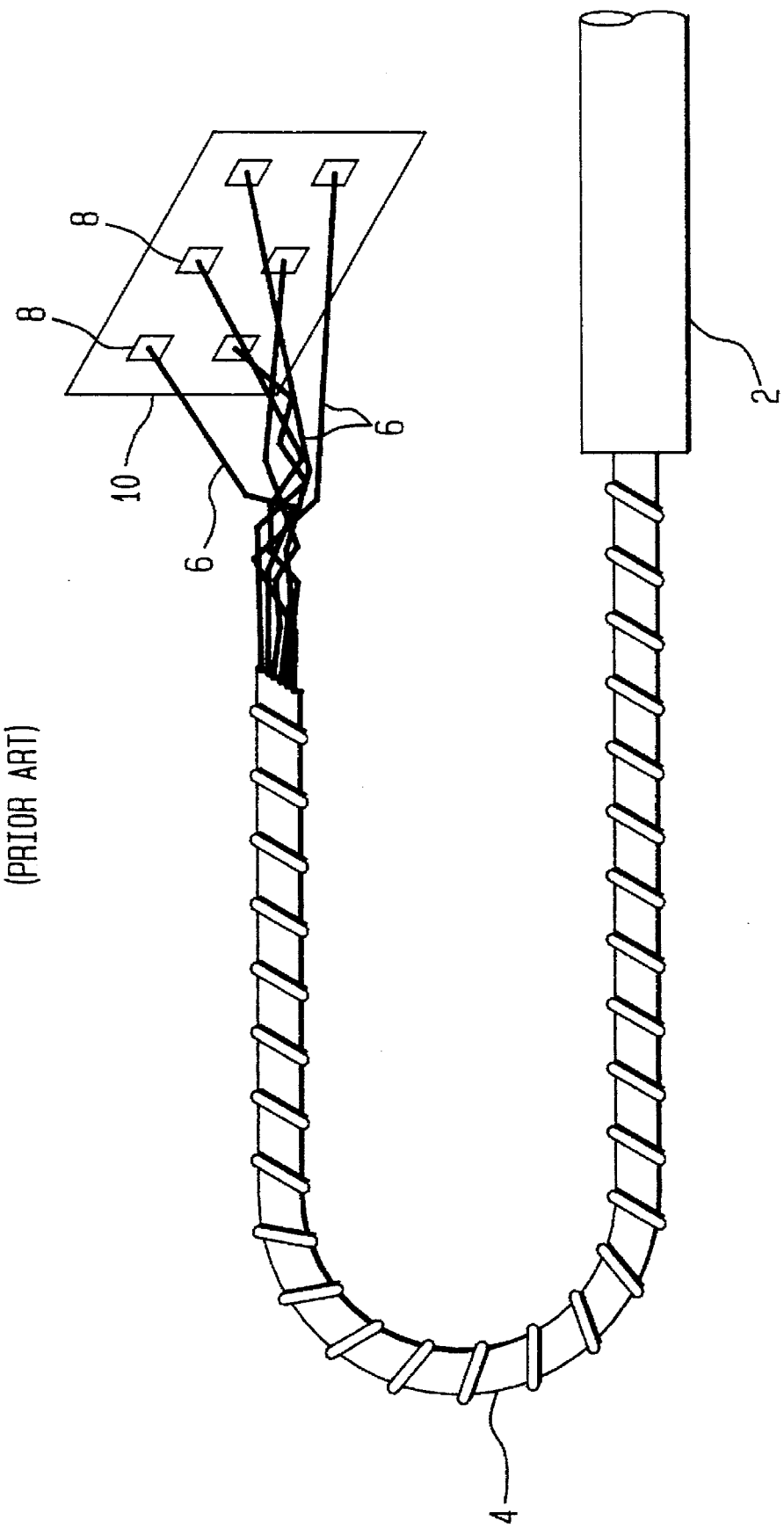
FIG. 1 is a view of a multi-fiber cable having its fibers connected to a fiber shelf.

With reference to FIG. 1, a multi-fiber cable 2 is shown with its optical fibers 6 connected to a fiber shelf 10. Each of the fibers 6 has a connector 8 at its end which is to be inserted within a respective adapter in the fiber shelf 10. A spiral tube 4 bundles the optical fibers 6, protects them, and routes them from the cable 2 to the fiber shelf 10. While not shown, each of the optical fibers 6 is typically, although not necessarily, positioned within a furcation tube.

As shown in FIG. 1, the optical fibers 6 become intertwined within the spiral tube 4 and are bent as the fibers 6 are routed to the fiber shelf 10. If any of the fibers 6 are bent about a small radius, or kinked, as sometimes happens, the bend in the fibers 6 will cause a signal loss and, if the bend is smaller than the minimum bend radius for the fibers 6, they will break. Even without breakage, signal transmission will be impaired.

Figure 2:
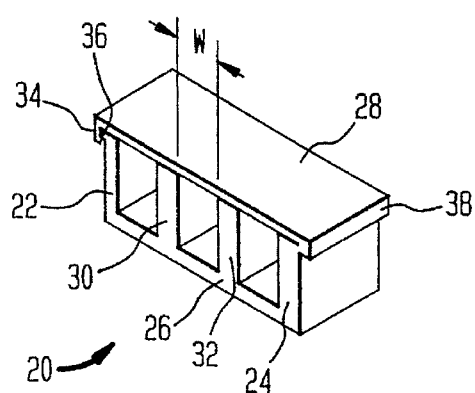
FIG. 2 is a preferred embodiment of a fiber holder according to a first embodiment of the invention.

A fiber holder 20 according to a first embodiment of the invention is shown in FIG. 2 and comprises first and second side walls 22 and 24, a bottom wall 26, and a top wall 28. The first and second side walls 22 and 24 are parallel to each other and the top and bottom walls 28 and 26 are also parallel to each other. Holder 20 is preferably made of a semi-rigid plastic material.

A hinge 38 is preferably formed between the top wall 28 and one end of the second side wall 24 and a latch is formed at the other end of the top wall 28. The latch is for releasably engaging the top wall 28 to the first side wall 22 and is comprised of a depending hook 34 on the top wall 28 which releasably engages a raised edge 36 on the first side wall 22. As will be more apparent from the description below, optical fibers 6 can be inserted into the holder 20 by releasably disengaging the top wall 28 from the side wall 22.

The fiber holder 20 also has third and fourth walls 30 and 32 located between and spaced from the first and second side walls 22 and 24 and parallel thereto. Each of the walls 22, 24, 30, and 32 is spaced apart from an adjacent one of the walls 22, 24, 30, and 32 by a predetermined distance W selected according to the outer diameter of the fibers 6, which includes the dimensions of the furcation tubes. More specifically, the predetermined distance W is greater than the outer diameter D of the largest optical fiber 6 in the bundle but is less than twice the outer diameter D' of the smallest fiber 6 in the bundle. In this manner, the order of the optical fibers 6 within the holder 20 is fixed and cannot change.

Figure 3A:
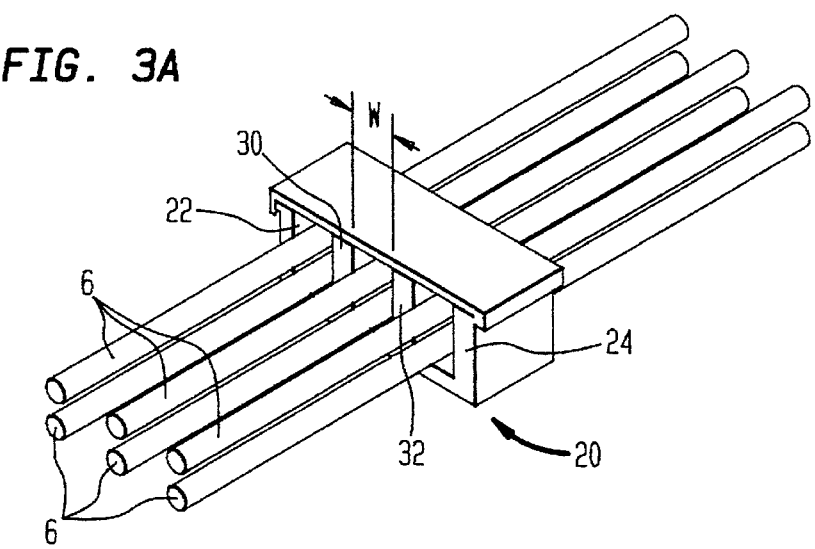
FIG. 3 (A) is a perspective view of the fiber holder of FIG. 2 mounted to a fiber bundle.

As shown in FIG. 3(A), the fiber holder 20 can maintain the order of a plurality of optical fibers 6. For the fiber holder 20, a set of two fibers 6 is located between each pair of adjacent side walls, such as between walls 22 and 30. Because the predetermined distance W between adjacent walls 22, 24, 30, and 32 is less than twice the outer diameter of the fiber 6, the order of the fibers 6 within the fiber holder 20 remains fixed. In other words, a fiber 6 between walls 22 and 30 cannot switch place with the other fiber 6 between walls 22 and 30 by moving from a lower position to an upper position or, conversely, from the upper position to the lower position within the holder 20. The optical fibers 6 therefore cannot become intertwined within the holder 20.

Figure 3B:
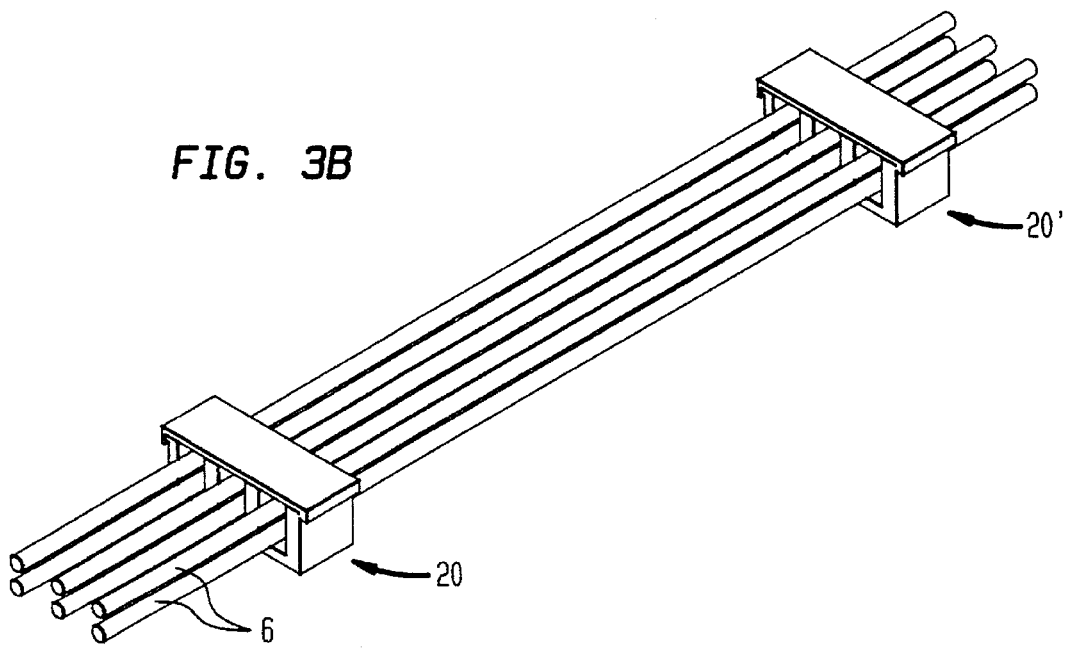

In order to maintain the optical fibers in a certain order for a long length, more than one fiber holder 20 may be necessary. For instance, as shown in FIG. 3(B), a first fiber holder 20 is located near one end of the optical fibers 6 while a second fiber holder 20' is located at another end of the optical fibers 6. Since each of the fiber holders 20 and 20' maintain the fibers 6 in the same fixed order, the fibers 6 do not become intertwined in the region between the two fiber holders 20 and 20'. Also, because the fibers 6 do not become intertwined, the amount of fiber bending, signal loss, and fiber breakage are all significantly reduced.

Figure 4A:
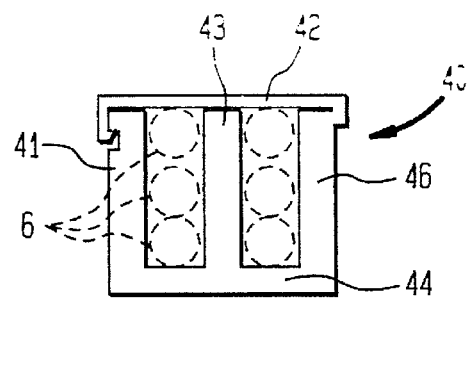
FIG. 4 (A) is a front view of a fiber holder according to a second embodiment of the invention.
Figure 4B:
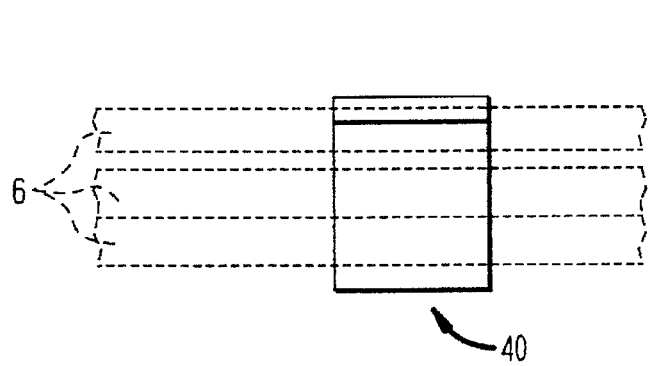

A fiber holder 40 according to a second embodiment of the invention is shown in FIGS. 4(A) and 4(B) and comprises a top wall 42, a bottom wall 44, first and second side walls 41 and 46, and a middle side wall 43. As with the fiber holder 20, the predetermined distance W between the first side wall 41 and the intermediate side wall 43 and between the second side wall 46 and the intermediate side wall 43 should be greater than the outer diameter D of the largest fibers 6 but should be less than twice the outer diameter D' of the smallest of the fibers 6. With such a spacing W between the side walls 41, 43, and 46, the order of the fibers 6 remains fixed within the fiber holder 40. The holder 40 differs from the holder 20 in that three fibers 6 may be placed between the top wall 42 and the bottom wall 44 whereas only two fibers could be placed between the top and bottom walls 28 and 26 of the holder 20.

Figure 5A:
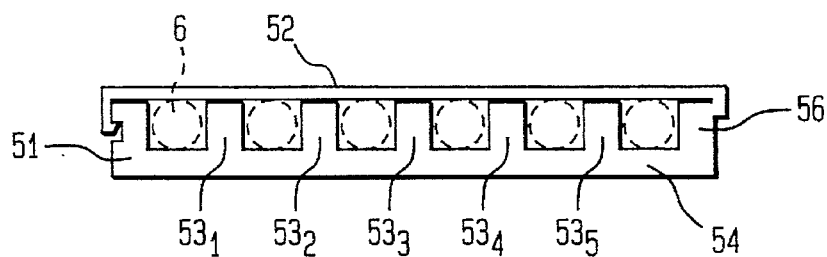
FIG. 5 (A) is a front view of a fiber holder according to a third embodiment of the invention.
Figure 5B:
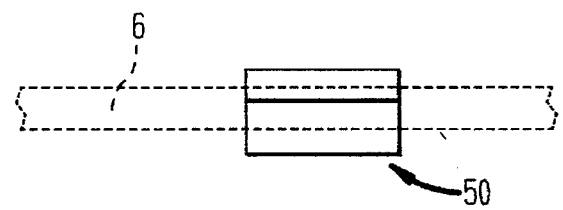

A fiber holder according to a third embodiment of the invention is shown in FIGS. 5(A) and 5(B) and comprises a top wall 52, a bottom wall 54, a first side wall 51, a second side wall 56, and a plurality of intermediate walls 53. The fiber holder 50 has first to fifth intermediate walls $53_1$ to $53_5$ between the first and second side walls 51 and 56 and parallel thereto.

The spacing between each adjacent pair of side walls, such as between the first side wall 51 and the first intermediate side wall $53_1$, is equal to the predetermined distance W. The predetermined distance W, as with the other fiber holders 20 and 40, is greater than the outer diameter D of the fibers 6. The spacing between adjacent side walls for the holder 50, in contrast to the spacing between adjacent side walls in holders 20 and 40, is intended to contain only a single fiber 6 and can therefore be any size greater than the outer diameter of the fibers 6. The spacing between the walls 51, 53, and 56, however, is preferably close to the outer diameter of the fiber 6 so as to minimize the overall size of the fiber holder 50.

Figure 6A:
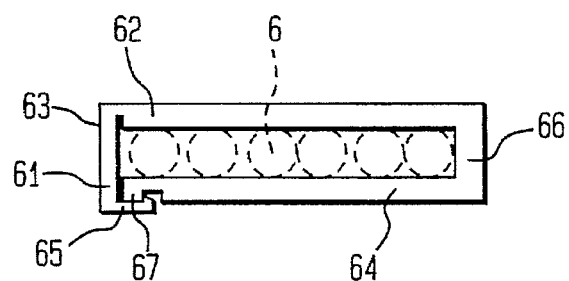
FIG. 6 (A) is a front view of a fiber holder according to a third embodiment of the invention.
Figure 6B:
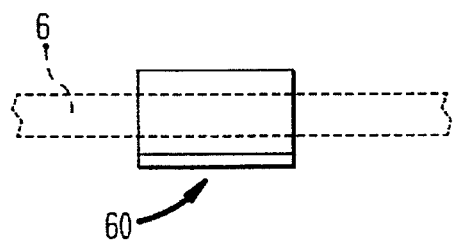

A fiber holder 60 according to a fourth embodiment of the invention is shown in FIGS. 6(A) and 6(B) as lying on its side. Holder 60 comprises a top wall 61, a bottom wall 66, a first side wall 62, and a second side wall 64. The spacing W between the two side walls 62 and 64 is greater than the maximum outer diameter D of the fiber but is less than twice the minimum outer diameter D' of the fiber 6. Thus, the fibers 6 within the fiber holder 60 are maintained in a certain order and cannot shift relative to each other. Also, as with the other embodiments of fiber holders 20, 40, and 50, the top wall 61 of the fiber holder 60 has a hinge 63 at one end and a latch 65 at the other end for releasably engaging the top wall 61 to the side wall 64.

The holder 60 has been illustrated on its side so as to highlight the differences between the holder 60 and the holder 50. As should be apparent from a comparison of the fiber holder 50 to the fiber holder 60, the orientation of a fiber holder relative to an array of fibers 6 is not critical to the invention. The fiber holder 50 has the top wall 52 oriented across the width of the array of fibers 6 whereas the holder 60 has the top wall 61 oriented at one side of the array of fibers 6. Because the orientation of the holder is not critical to the invention, the nomenclature of the walls is also not critical to the invention. For example, the first and second side walls of a fiber holder could alternatively be labelled as top and bottom walls. Furthermore, the wall of the holder which is hinged can be any wall and is not limited to just the top wall. For instance, one of the side walls or the bottom wall may be hinged to the fiber holder so that the fibers 6 are placed within the holder through one of these other walls.

The fiber holders according to the invention are preferably manufactured from a plastic material, such as polyethylene. It should be understood, however, the fiber holder may be formed from any suitable type of material, such as from other plastics or from composite materials.

The size of the fiber holders may be varied according to the size of the fibers 6. Thus, a fiber holder can be designed to hold a 250 micron fiber, a 900 micron fiber, or an optical fiber of any other size. Moreover, a holder according to the invention can be used when the fibers are placed within other members, such as furcation tubes or buffer tubes, and can be used with cables other than fibers. For instance, the holder may be used with other types of conductor cables, such as electrical wires, and could also be used with other types of materials, such as string or rope.

A method of unraveling a plurality of fibers is shown in FIGS. 7(A) to 7(C). As shown in FIG. 7(A), the fibers 6 are intertwined with each other along a length L of the fibers 6. In this example, connectors 8 are coupled to the ends of the fibers 6 and are to be placed within respective adapters in a fiber shelf, such as the fiber shelf 10 in FIG. 1. As discussed above, the fibers 6 must be carefully unraveled so that the connectors 8 may be routed to their respective adapters in the fiber shelf 10.

With the invention, the fibers 6 are placed within the fiber holder 20 in a certain order. As the fiber holder 20 is moved toward the ends of the fibers 6 in the direction of the arrow, the fiber holder 20 unravels the fibers 6 and orients them in the certain order. Once the fibers 6 have become unraveled along the entire length L, the fiber holder 20 is slid back to its original position, as shown in FIG. 7(B). If an additional length of fibers 6 is needed in order to route the connectors 8 to their respective adapters in the shelf 10, then the fiber holder 20 may be slid further away from the ends of the fibers 6, thereby providing an additional working length of the fibers 6, as shown in FIG. 7(C).

As shown in FIGS. 7(A) to 7(C), a second fiber holder 20' may also be used with the fiber holder 20. The fiber holder 20' is preferably positioned close to the end of the multi-fiber cable, such as multi-fiber cable 2 in FIG. 1, and maintains the fibers 6 in a fixed order between the two fiber holders 20 and 20'. Consequently, the two fiber holders 20 and 20' can prevent the fibers 6 from becoming intertwined and from becoming bent or kinked in the distance between the two holders 20 and 20'. The fiber holders 20 and 20' are therefore preferred over the spiral tube 4 since the fiber holders 20 and 20' reduces signal loss and fiber breakage. While only two fiber holders 20 and 20' have been shown in FIGS. 7(A) to (C), it should be understood that a larger number of fiber holders may be used to maintain a larger length of fibers in a certain fixed order and thereby to reduce fiber bending.

As shown below in Table 1, an experiment was conducted to determine the amount of time that can be saved through the use of a fiber holder according to the invention. An intertwined bundle of twelve fibers each of one meter length was unraveled manually and also with a fiber holder according to the invention during four separate trials. For each trial, the fiber holder enabled the fibers to be unraveled in a significantly smaller amount of time than without the fiber holder. On average, a manual unraveling of the fibers 6 required approximately 6.9 minutes whereas a bundle of intertwined fibers may be unraveled with the fiber holder in approximately 1 minute. The fiber holders according to the invention therefore enable the technician to route the connector 8 on each fiber 6 to its respective adaptor in a fiber shelf 10 in much less time than heretofore.

TABLE 1

| Method | Elapsed Time Trial No. | | | | |
|---|---|---|---|---|---|
| | 1 | 2 | 3 | 4 | Avg. |
| Without Holder | 6.3 | 7.5 | 7.0 | 6.8 | 6.9 |
| With Holder | 1.3 | 1.0 | 0.8 | 0.9 | 1.0 |

Such a decrease in elapsed time over prior art methods represents an enormous economic benefit when it is realized that the operation of unraveling is performed an innumerable number of times each year.

In addition to allowing the technician to perform his or her job more efficiently, the fiber holders according to the invention also reduce the chance that a fiber may become bent. Whereas the fibers 6 would become intertwined with each other within the spiral tube 4 of FIG. 1, the fiber holders 20 and 20' maintain the fibers 6 within a certain fixed order and prevent the fibers 6 from becoming intertwined with each other. As a result, the fibers 6 do not become bent within the length between the multi-fiber cable 2 and the fiber shelf 10, thereby reducing any chance of signal loss or fiber breakage.

The fibers 6 are preferably placed within the holders 20 and 20' during the fabrication of the multi-fiber cable 2. By initially placing the fibers 6 within the holders 20 and 20', the maximum amount of benefit can be derived from the holders 20 and 20'. The fibers 6, however, can be placed within the fiber holders 20 and 20' at any time and at any location where optical fibers may become intertwined with each other.

The foregoing has been illustrative of the features and principles of the present invention. Various changes or modifications to the invention may be apparent to workers in the art without departure from the spirit and scope of the invention.

For example, while the holders have been described with a hinged wall for the insertion of the cables, they can be formed without the hinged wall. With such a holder, the cables could be inserted through the ends of the holder during the fabrication of the cables or at any subsequent time.

The features and principles of the present invention have been illustrated in an embodiment for use with optical fibers. It is to be understood that these features and principles may be utilized in other embodiments involving other types of filamentary communications or transmission media such as, for example, copper wires and the like.

I claim:

1. A holder for use with one or more filaments of filamentary communication media, wherein the individual filaments of the media can range in diameter from a minimum diameter D' to a maximum diameter D, said holder comprising:

first and second side walls approximately parallel to each other and spaced apart from each other a predetermined distance;

a bottom wall interconnecting said first and second side walls at a first end of each of said first and second side walls; and a top wall interconnecting said first and second side walls at a second end of each of said first and second side walls, approximately parallel to said bottom wall and spaced a fixed distance from said bottom wall;

said fixed distance between said top and bottom walls being greater than a sum of all outer diameters of the one or more filaments whereby all of the filaments may be placed in the space defined by said fixed distance between said top and bottom walls, regardless of their diameter;

wherein said predetermined distance between said first and second side walls is greater than the maximum diameter D of an individual filament and less than twice the minimum diameter D' of an individual filament of the one or more filaments whereby the one or more filaments in the space defined by the predetermined distance from said first side wall to said second side wall are fixed in order.

2. The holder as set forth in claim 1, wherein said top wall is hinged at one end thereof to one of said first or second side walls and is releasably attachable to the other of said first or second side walls at the other end thereof.

3. The holder as set forth in claim 2, wherein said top wall has a latch means of one end thereof, said other of said first or second side walls has a recess formed therein at said second end and opposite said latch means for receiving said latch means on said top wall for releasably attaching said top wall to said other of said first or second side walls.

4. The holder as set forth in claim 1, wherein said first and second side walls, said bottom wall, and said top wall are comprised of polyethylene.

5. The holder as set forth in claim 1, wherein the one or more filaments comprise optical fibers and said predetermined distance is less than twice the minimum outer diameter D' of an optical fiber.

6. The holder as set forth in claim 5 wherein said outer diameter of said optical fiber is 250 microns.

7. The holder as set forth in claim 5, wherein said outer diameter of said optical fiber is 900 microns.

8. The holder as set forth in claim 1, further comprising a third side wall parallel to said first and second side walls and spaced said predetermined distance from said first side wall, said bottom and top walls interconnecting said third wall to said first wall at first and second ends of the first and third walls.

9. The holder as set forth in claim 1, further comprising an intermediate wall parallel to said top and bottom walls and positioned between said top and bottom walls, for dividing the filaments into at least two groups with the two groups being located on either side of said intermediate wall.

10. The holder as set forth in claim 9, wherein each of the two groups only has one filament.

11. A method of unraveling a plurality of filaments of filamentary communication media in a raveled region wherein the filament diameters may range from a maximum diameter D to a minimum diameter D', with a holder having the capability of maintaining the filaments held therein in substantially the same position relative to each other regardless of their outer diameters and their number, said method comprising the steps of:

positioning the filaments within the holder in the desired order at a point along the lengths of the filaments where they are not raveled;

placing the filaments in the raveled region in the desired order by sliding the holder into the raveled region towards a first end of the filaments; and returning the holder to its original position by sliding it toward a second end of the filaments.

12. The method as set forth in claim 11, further comprising the steps of placing the filaments in a second holder and maintaining the filaments in the desired order between the two holders.

13. The method as set forth in claim 11, further comprising the step of routing the filaments to a respective plurality of termination points.

14. The method as set forth in claim 11, wherein the step of positioning the filaments within the holder comprises the step of positioning optical fibers in the desired order within the holder.

* * * * *